United States Patent
Moreira Martins et al.

(10) Patent No.: US 12,088,454 B2
(45) Date of Patent: Sep. 10, 2024

(54) RESTORING SYSTEM FUNCTIONALITY WHEN PRIMARY MAINTENANCE INTERFACE IS UNAVAILABLE

(71) Applicant: Kyndryl, Inc., New York, NY (US)

(72) Inventors: Allan Douglas Moreira Martins, Sumare (BR); Robert Justiniano Ferreira, Hortolandia (BR); Marcos Lara, Curitiba (BR); Joab Rodrigues Bastos, Sao Caetano do Sul (BR); Tiago Dias Generoso, Pocos de Caldas (BR)

(73) Assignee: Kyndryl, Inc., New York, NY (US)

( * ) Notice: Subject to any disclaimer, the term of this patent is extended or adjusted under 35 U.S.C. 154(b) by 22 days.

(21) Appl. No.: 18/157,358

(22) Filed: Jan. 20, 2023

(65) Prior Publication Data

US 2024/0250865 A1 Jul. 25, 2024

(51) Int. Cl.
G06F 15/173 (2006.01)
H04L 41/0654 (2022.01)

(52) U.S. Cl.
CPC ................................. H04L 41/0654 (2013.01)

(58) Field of Classification Search
CPC ............. H04L 41/0654; H04L 41/0659; H04L 41/0661
USPC ......................................... 709/223–224, 250
See application file for complete search history.

(56) References Cited

U.S. PATENT DOCUMENTS

| | | | |
|---|---|---|---|
| 7,861,117 B2 | 12/2010 | Coronado et al. | |
| 8,826,077 B2 | 9/2014 | Bobak et al. | |
| 9,379,979 B2* | 6/2016 | Solis | H04L 45/7453 |
| 10,069,933 B2* | 9/2018 | Solis | H04L 41/0893 |
| 2002/0031214 A1* | 3/2002 | Cowan | H04L 9/40 379/221.09 |
| 2004/0068722 A1* | 4/2004 | Amodio | H04L 67/34 717/169 |
| 2004/0153724 A1 | 8/2004 | Nicholson et al. | |
| 2005/0165731 A1* | 7/2005 | Funk | G05B 19/41865 |
| 2005/0268295 A1 | 12/2005 | Amodio et al. | |
| 2006/0248513 A1 | 11/2006 | Foster et al. | |
| 2006/0277164 A1* | 12/2006 | Smith | G06F 16/245 |
| 2007/0157016 A1 | 7/2007 | Dayan et al. | |
| 2009/0158016 A1* | 6/2009 | Clarke | G06F 9/4843 712/229 |
| 2012/0254889 A1 | 10/2012 | Demkowicz et al. | |

(Continued)

OTHER PUBLICATIONS

Christopher Hastings et al., "Introduction to the New Mainframe: Networking", Published Aug. 2006, 394 pages.

(Continued)

*Primary Examiner* — Bharat Barot
(74) *Attorney, Agent, or Firm* — CANTOR COLBURN LLP; Erik Swanson

(57) ABSTRACT

An approach for restoring system functionality when a primary maintenance interface is unavailable is provided. In an embodiment, a computer maintenance application that is configured to use a Virtual Telecommunications Access Method (VTAM) interface to connect to a mainframe system is retrieved. A mainframe system is accessed with the computer maintenance application using the VTAM interface. During the access, a maintenance activity is performed on the mainframe system using the computer maintenance application.

20 Claims, 9 Drawing Sheets

(56) References Cited

U.S. PATENT DOCUMENTS

2014/0258256 A1* 9/2014 Dee .................. G06F 9/547
                                                          707/705

OTHER PUBLICATIONS

"z/OS 2.3.0. version documentation", Copyright IBM Corporation 2015, 241 pages.
IBM, "Contributions of z/OS and the z/OS elements", Printed: Sep. 2022, 7 pages.

* cited by examiner

RESTORING SYSTEM FUNCTIONALITY WHEN PRIMARY MAINTENANCE INTERFACE IS UNAVAILABLE

TECHNICAL FIELD

In general, embodiments of the present invention relate to server resource maintenance. Specifically, embodiments of the present invention relate to an approach that provides an alternative solution for restoring system functionality when the primary maintenance tools are unavailable.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

One type of server that is often utilized in the networked computing environment, as well as in more stand-alone computing environments, is a server running in a z/OS environment. Z/OS is a 64-bit mainframe operating system (OS) developed or its family of enterprise z/Architecture mainframe computers that organizations often use for running mission-critical applications. In order to provide this functionality, servers running in a z/OS environment usually include a number of different systems, utilities, interfaces, etc., which all run in concert. The great complexity of a z/OS system, combined with all the different components that are necessary for it to function properly, requires a recovery drive system that demands rigorous maintenance and continuous updating of the I/O configuration, along with a communications network environment, so that it can be useful in critical situations. Failure to do such maintenance and updating can result in the recovery drive service not serving its recovery purpose. As such, much time is often spent in this process of maintaining the driver system. However, even with such attention, there is no guarantee that the recovery drive system will always be available to perform its function every time it is needed.

SUMMARY

In general, an approach for restoring system functionality when a primary maintenance interface is unavailable is provided. In an embodiment, a computer maintenance application that is configured to use a Virtual Telecommunications Access Method (VTAM) interface to connect to a mainframe system is retrieved. A mainframe system is accessed with the computer maintenance application using the VTAM interface. During the access, a maintenance activity is performed on the mainframe system using the computer maintenance application.

One aspect of the present invention provides a method for restoring system functionality when a primary maintenance interface is unavailable, the method comprising the computer-implemented processes of: retrieving a computer maintenance application that is configured to use a Virtual Telecommunications Access Method (VTAM) interface to connect to a mainframe system; accessing the mainframe system with the computer maintenance application using the VTAM interface; and performing a maintenance activity on the mainframe system using the computer maintenance application.

Another aspect of the present invention provides a system for restoring system functionality when a primary maintenance interface is unavailable, comprising: a memory medium comprising instructions; a bus coupled to the memory medium; and a processor coupled to the bus that when executing the instructions causes the system to: retrieve a computer maintenance application that is configured to use a Virtual Telecommunications Access Method (VTAM) interface to connect to a mainframe system; access the mainframe system with the computer maintenance application using the VTAM interface; and perform a maintenance activity on the mainframe system using the computer maintenance application.

Yet another aspect of the present invention provides a computer program product for restoring system functionality when a primary maintenance interface is unavailable, the computer program product comprising a computer readable storage medium having program instructions embodied therewith, the program instructions executable by a processor to cause an electronic computation device to: retrieve a computer maintenance application that is configured to use a Virtual Telecommunications Access Method (VTAM) interface to connect to a mainframe system; access the mainframe system with the computer maintenance application using the VTAM interface; and perform a maintenance activity on the mainframe system using the computer maintenance application.

Still yet, any of the components of the present invention could be deployed, managed, serviced, etc., by a service provider who offers to implement passive monitoring in a mainframe system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for restoring system functionality when a primary maintenance interface is unavailable is provided. In an embodiment, a computer maintenance application that is configured to use a Virtual Telecommunications Access Method (VTAM) interface to connect to a mainframe system is retrieved. A mainframe system is accessed with the computer maintenance application using the VTAM interface. During the access, a maintenance activity is performed on the mainframe system using the computer maintenance application.

Figure 1:
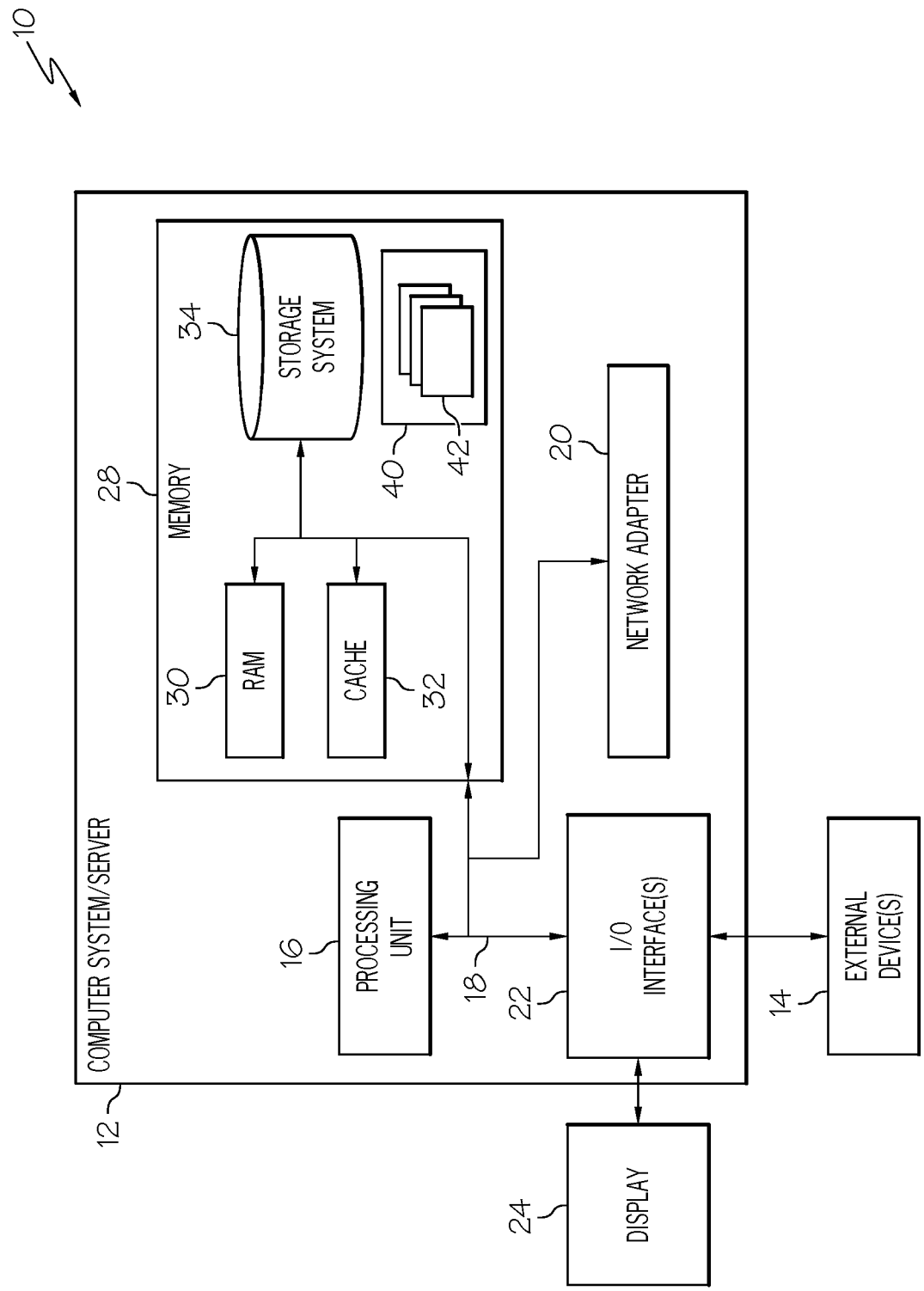
FIG. 1 depicts an example data processing system according to an embodiment of the present invention.

Referring now to FIG. 1, a schematic of an example of a data processing system is shown. Data processing system 10 is only one example of a suitable data processing system and is not intended to suggest any limitation as to the scope of use or functionality of embodiments of the invention described herein. Regardless, data processing system 10 is capable of being implemented and/or performing any of the functionality set forth hereinabove.

In data processing system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in data processing system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
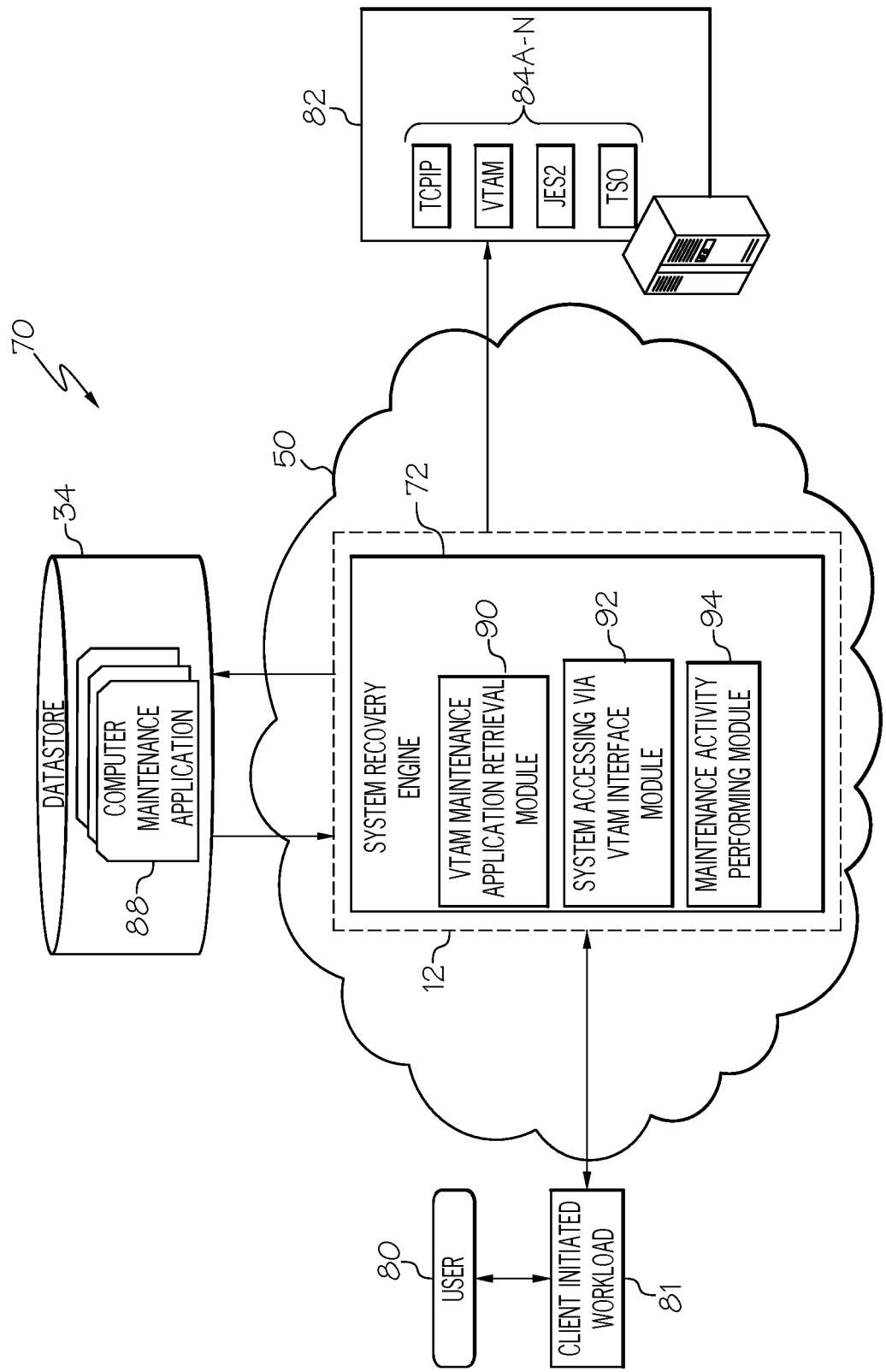
FIG. 2 depicts an example system diagram according to an embodiment of the present invention.

Referring now to FIG. 2, a system diagram of a networked computing environment 70 describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 2 for illustrative purposes only. In the event the teachings recited herein are practiced in a networked computing environment 70, each mainframe system 82 need not have a system recovery engine (hereinafter "system 72"). Rather, system 72 could be loaded on a server or server-capable device that communicates (e.g., wirelessly) with mainframe system 82 to provide processing therefor. Additionally, or in the alternative, all or portions of system 72 can execute, along with other system utilities 84A-N, as a system utility on mainframe device 82 (e.g., in a z/OS operating system environment and/or on an IBM z14 physical mainframe machine). Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands to restore system functionality for a mainframe system 82 (e.g., an IBM z14 device), which can be in networked computing environment 70, particularly in situations in which primary (e.g., TSO-based) troubleshooting utilities are unavailable. Such other system(s) have not been shown in FIG. 2 for brevity purposes.

Along these lines, system 72 may perform multiple computer functions. Specifically, among other functions, system 72 can restore system functionality to computer system 82 when a primary maintenance interface is unavailable. To accomplish this, system 72 can include: VTAM maintenance application retrieval module 90, a system accessing via VTAM interface module 92, and a maintenance activity performing module 94.

As shown, system diagram 70 includes a mainframe system 82, which could be a z/OS system. Mainframe system 82 has capacity for a number of different types of work including, but not limited to, capacity used by batch work, capacity used by other work (e.g., on demand user workloads, etc.), free capacity, and/or the like. As included herein, batch work can be understood as including scheduled jobs that are often run at a scheduled time of day and/or on a particular day of the week, day of the month, day of the quarter, day of the year, etc. These batch jobs are often scheduled to execute in conjunction with (e.g., before, after, or during) other related batch jobs to accomplish a common objective.

Figure 3:
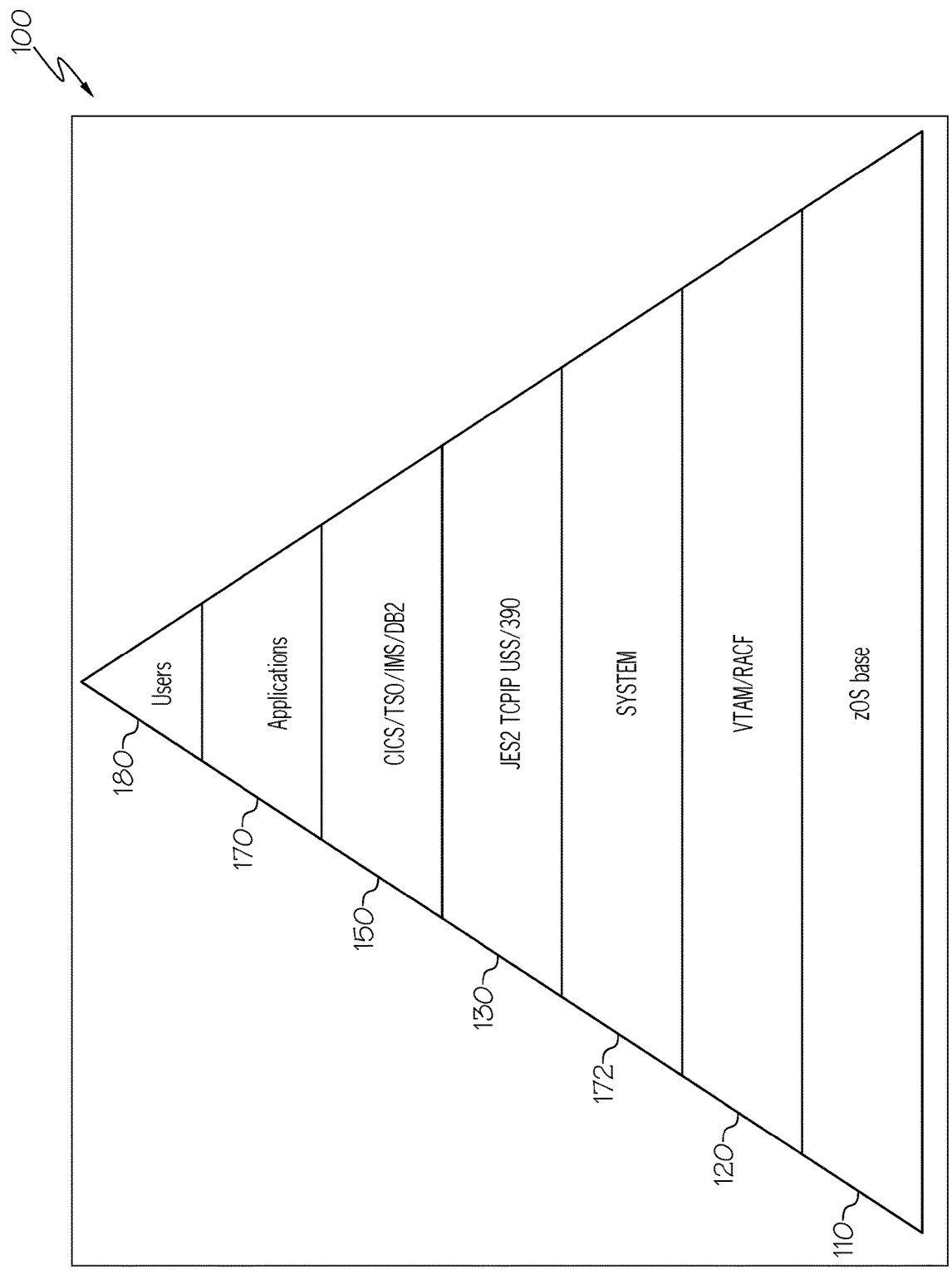
FIG. 3 depicts a mainframe environment according to an embodiment of the present invention.

Referring to FIG. 3, an example mainframe computer environment 100 is shown according to an embodiment of the invention. A mainframe can be defined as a large computer normally dedicated to processing a large amount of information. The term mainframe was used to refer to the main cabinet that housed the central processing unit in the first computers. In the 1950s and 1960s, mainframe computers dominated the information technology area in large corporations. Mainframe computers are often able to offer processing services to thousands of users through thousands of terminals, which may be connected directly or over a network.

Although they are losing space for PC architecture servers and Unix servers, which may have a lower cost, mainframe computers are still widely used in commercial environments and large companies (e.g., banks, aviation companies, universities, etc.). Although mainframe computers previously occupied a large space and needed a special environment for their operation, modern mainframes are often the same size as other large servers, although generally with less electricity consumption. Mainframes are capable of performing operations at great speed and over a very large volume of data.

Mainframes have the ability to run different operating systems, with their hardware resources being virtualized through a native hardware component (PR/SM) or additionally by software. In this way, a single mainframe computer can replace dozens or even hundreds of smaller servers using virtual machines. Mainframes arose with the need for companies to perform tasks, which took days to complete. It was then necessary to create a supercomputer capable of performing these tasks in less time and more precisely.

As shown in FIG. 3, mainframe environment 100 is based on a z/OS 110 operating system layer. z/OS 110 is a 64-bit operating system for mainframes, created by IBM, as the successor to OS/390. Z/OS 110 has a UNIX implementation for mainframes, known as Multiple Virtual Storage (MVS). Z/OS 110 offers many of the attributes of other modern operating systems, but it also retains much of the functionality that originated in the 1960s and 1970s, which may often be still in everyday use. This functionality includes Customer Information Control System (CICS), IBM Information Management System (IMS), IBM DB2, IBM Resource Access Control Facility (RACF) and IBM Systems Network Architecture (SNA).

Z/OS 110 also runs 64-bit Java, supports UNIX application programmer interfaces (APIs) and applications (Single UNIX Specification) and communicates directly with TCP/IP. A complementary IBM operating system, z/VM, provides management of multiple virtual systems (guests) on the same physical mainframe. These new functions on z/OS 110 and z/VM, and support for Linux on zSeries, have encouraged the development of new applications for mainframes. Many of them use WebSphere Application Server for z/OS 110 middleware.

Figure 4:
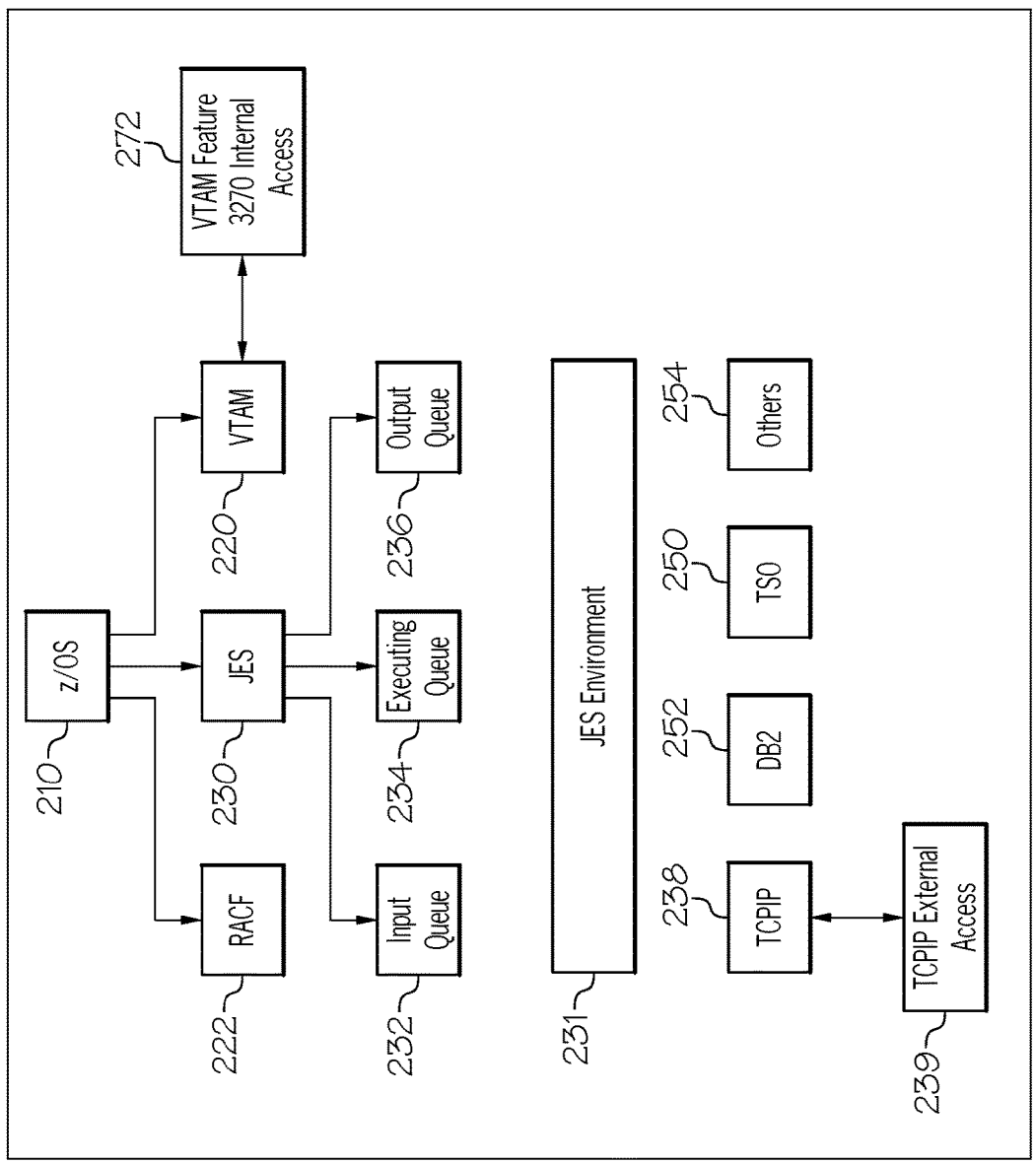
FIG. 4 a systems diagram according to an embodiment of the present invention.

Referring now to FIG. 4, a systems diagram 200 is shown according to embodiments of the invention. As shown, systems diagram 200 has a z/OS 210 operating system that corresponds to z/OS 110 layer.

Referring again additionally to FIG. 3, operating on top of z/OS 110 layer is a VTAM/RACF 120 layer. VTAM/RACF layer includes a Virtual Telecommunications Access Method (VTAM) 220 subsystem and a Resource Access Control Facility (RACF) 222 subsystem. VTAM 220 is a subsystem that performs communication via the network between an application and the terminal (or another application). For example, the connection between the asynchronous transfer mode (ATM) system and complex instruction set computing (CICS) or Information Management Service (IMS) may be accomplished using VTAM 220. RACF 222 is a subsystem that provides authentication services for z/OS 210 computing systems. To this extent, RACF 222 can perform user identification and authentication, resource access authentication, user activity monitoring, administration access services, and/or the like. Operating on top of VTAM/RACF 120 layer can be system 172, as will be described hereinafter.

JES2 TCPIP USS/390 130 layer occupies a new level layer. As illustrated, JES2 TCPIP USS/390 130 layer can include such subsystems as JES2 230, TCPIP 238, USS/390, and/or the like. The JES2 230 Job Entry Subsystem (JES) is a component of IBM's mainframe operating systems that is responsible for managing batch workloads. JES2 230 is designed to provide efficient execution of batch jobs. Job processing is divided into several phases to provide parallelism through pipelining. These phases include input processing that includes an input queue 232 where jobs are read and interpreted, the execution phase that includes an execution queue 234 where jobs run, and output processing that includes an output queue 236 where job output is printed or stored on data acquisition and storage (DASD). Jobs that are in the same phase of execution are usually said to reside on a particular queue 232, 234, 236; for example, jobs that are currently executing are on the execution queue 234.

To improve I/O efficiency, JES performs spooling, which provides a JES environment 231 for multiple jobs with simultaneous access to a common storage volume. JES environment 231 uses a structure called a checkpoint to backup information about currently executing jobs and their associated output. The checkpoint can be used to restore jobs and output in the event of unexpected hardware or software failures.

Although JES2 230 and JES3 provide the same core functionality, there are certain features that may be present in one JES environment 231 but not the other. Because of these differences, one JES environment 231 may be favored over the other in certain customer installations. JCL is used to define jobs to both JES2 230 and JES3, but small changes usually need to be made to the JCL to get a job written for one JES environment 231 to run on the other.

TCP/IP 238 is a set of communication protocols that can provide TCPIP external access 239 between computers on a network. Its name comes from two protocols: TCP (Transmission Control Protocol—Transmission Control Protocol) and IP (Internet Protocol—Internet Protocol, or yet, interconnection protocol). The set of protocols can be seen as a layer model (OSI Model), where each layer is responsible for a group of tasks, providing a set of well-defined services for the upper layer protocol. The higher layers are logically closer to the user (called the application layer) and deal with more abstract data, relying on lower layer protocols for tasks with a lower level of abstraction.

Operating on top of JES2 TCPIP USS/390 130 layer is a CICS/TSO/IMS/DB2 150 layer. CICS/TSO/IMS/DB2 150 layer can include subservices such as TSO 250 and DB2 252, among others 254 such as CICS and IMS. Time Sharing Option (TSO) 250 is responsible for the interaction between the System and the Operator. It makes it possible to check transactions and allows the insertion of commands from the terminal to allocate files and run programs. It works on the basis of ISPF which provides a menu-based interface and access to system applications. It is a support, monitoring and application development tool in the z/OS 210 environment. TSO 250 allows a system administrator to interact with the system to execute JOBs, monitor the operating system, define resources, view datasets, JES2 230 spool, task activities in the database (e.g., a database 2 (DB2) database 252) environment, and provide troubleshooting functions, among others.

Operating on top of CICS/TSO/IMS/DB2 150 layer is an applications 170 layer. Applications 170 can be programs, utilities, etc., that are directly and/or indirectly provided to a user 80 (FIG. 2). These applications 170 support a users 180 layer, by providing tools for user 80 to execute a client-initiated workload 81, among other things.

Figure 5:
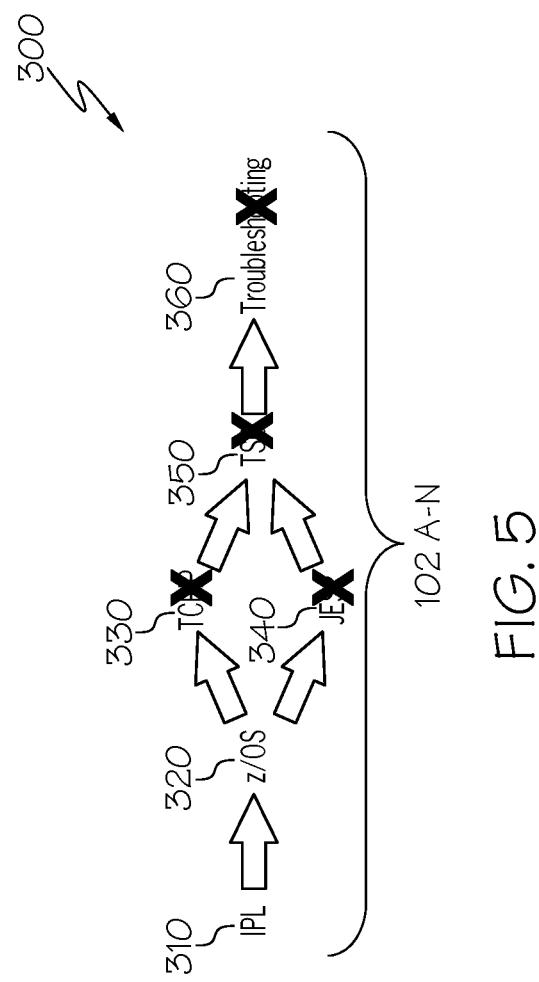
FIG. 5 depicts a flow diagram according to an embodiment of the present invention.

Referring now to FIG. 5, a flow diagram 300 that illustrates the flow among a number of systems and subsystems 302A-N in a mainframe environment is shown. As shown, troubleshooting 360 functions depend upon TSO 350 being operational. TSO 350, in turn, relies on both TCPIP 330 and JES2 340 being operational in order to function correctly. TCPIP 330 and JES2 340 operation depends upon the operation of z/OS 320, which results from an initial program load (IPL) 310. As shown in FIG. 5, TSO 350 is not functioning due to TCPIP 330 and/or JES2 340 not being operational. As such, troubleshooting 360 functionality is non-operational.

The inventors of the invention described herein have discovered certain deficiencies in the current solutions for restoring system functionality in situations, such as the one illustrated in FIG. 5, in which troubleshooting 360 functions enabled by TSO 350 are unavailable. The start of a z/OS 320 system can be highly impacted by any error that makes TSO 350 unable to start, making the process to identify and act to mitigate those errors a difficult, if not, impossible task. For example, when TSO 350 is unavailable, due to JES2 340 start problems or even during the initialization of the z/OS 320 operating system, a troubleshooting 360 is highly recommended. However, without TSO 350 it is not possible to identify, much less to make repairs to correct problems that may be preventing the start of JES2 340, and, consequently, of all other products that may depend on it (TCPIP 330, automation products, management software, databases, products support for the communications Network, etc.).

The unavailability of JES2 340 due any error in PROC and parameters of JES2 340 make the production environment completely invisible and unable to be accessed. In consequence, operators are unable to communicate with the system and it is not possible to execute any type of transaction in the database environment, leaving customers unable to perform their business activities to which they are completely committed. The solution to this problem may involve only a simple change in JES2 340 initialization parameters that corrects the JES2 340 operating procedure, but, with TSO 350 unavailable, there is no way to identify, much less to make, the necessary changes.

When the TSO 350 is unavailable on a Sysplex, Parallel Sysplex or Monoplex architecture, this unavailability offers no possibility of any interaction with the system to execute JOBs, monitor the operating system, define resources, view datasets, JES2 340 spool, task activities in the database environment, and or the like. The entire Production environment is often affected by this situation, with the communications network with the outside world ceasing to function and the operator having to access a driver system that has access to all disks in the system installation in order to make the necessary corrections to the systems that are preventing the proper functionality. As a consequence, current solutions to this problem may necessitate an IPL 310.

These solutions suffer from the fact that IPL 310 requires bringing the entire system offline for the time necessary to reset the system. This complete reset compromises the availability of the system for customers to run their business. Additionally, restoring the full JES 340 spool may necessitate IPLs 310 that require total cleaning of all information that is stored in the spool (e.g., a JES2 340 start with COLD option), leading to further time and resource costs and creating further implications for automation products, schedule, etc.

For example, assume mainframe system 82 is operating on a Monday, at peak time, when the production environment has tens of thousands of transactions being executed simultaneously. The workload is normal, as expected for the first day of the week, after a weekend in which few transactions are performed in the production environment. At this point, an alert is received that the system is slow and does not respond to commands. While a diagnosis of the system is being made, customers begin complaining that financial transactions, business transactions, etc., are not completed. Further, information arrives that the communications network has ceased to function. An attempt to log on to TSO 250 yields a message code that indicates that no more storage is available for address spaces because virtual memory usage exceeds REAL memory and PAGE datasets used for overflow have been filled. As a result, no new jobs can start, and TSO 250 is unavailable.

Using currently available solutions, this situation would begin a system degradation that would result in a forced initialization (IPL), because no commands can be accepted on the console. The consequences of such a forced IPL can cause many hours of analysis of what was being performed; what step the JOBs were on, so that the workload can be reestablished at the point that it was interrupted; which datasets were being updated; what databases and transactions were being executed; how to restore the execution of the JOBs through the scheduler software; and which transactions to roll back. Depending on the necessary actions, such as recovery of datasets, the availability of the system to customers can take minutes or hours. It can also create difficulties in terms of SLA compliance and/or monetary or reputational damage to the owner of the mainframe system and its customers.

The currently described invention addresses these deficiencies in the current solutions by utilizing the internal communications protocols present in the VTAM 220 (FIG. 4) system to perform troubleshooting 360 functions when TSO 350 functionality is unavailable. As additionally illustrated in FIGS. 3 and 4, VTAM 220 as included in VTAM/RACF layer 120 does not rely on either TCPIP 330 or JES2 340 in order to function correctly but is, conversely, independent from the JES2 340 or TCPIP 330. In contrast, a completed first IPL 310 that results in VTAM 220 being active in z/OS 320 system is the minimum condition for the proposed troubleshooting 360 feature, which accesses the VTAM 220, to be operational and available to correct any issues that may cause problems on a z/OS 320 environment IPL 310 that would otherwise require an IPL. This solution can provide a new avenue for performing troubleshooting 360, enabling further analysis of the z/OS 320 system, such as when the system is unable to start after an IPL 310, making troubleshooting 360 possible even when TSO 350 is offline. As a result, the production environment unavailability, loss of data, and/or corruption of any information that may result from the current solutions can be avoided.

Referring again to FIG. 2 in conjunction with FIGS. 3 and 4, VTAM maintenance application retrieval module 90 of system 72, as executed by computer system/server 12, is configured to retrieve a computer maintenance application 88 (e.g., VTAM feature 3270 internal access 272 of system 172 layer). Computer maintenance application 88 retrieved by VTAM maintenance application retrieval module 90 is configured to use VTAM 220 interface to connect to a mainframe system 82 rather than TSO 250. The result of this is a computer maintenance application 88 that can perform troubleshooting functions and/or perform repairs even when the primary TSO 250 troubleshooting functions are unavailable.

In order to accomplish this, a set of troubleshooting functions that are used to troubleshoot the system is adapted to function over VTAM 220 interface. These troubleshooting functions could include one or more troubleshooting functions that are typically embodied within TSO 250, which could be modified to remove functionality that may be supported by TSO 250 but that is unavailable using VTAM 220 interface. Additionally, or in the alternative the troubleshooting functions could include one or more troubleshooting functions that are specific to the VTAM 220 environment that utilize functionality and/or that access information using pathways that are specific to VTAM 220. In any case, this set of troubleshooting functions are included in computer maintenance application 88 that is retrieved by VTAM maintenance application retrieval module 90.

These troubleshooting functions can include, but are not limited to functions that can access data regarding system operations, system functionality, error data, and/or the like; analytical functions that analyze the collected data, check application status, determine driver functionality, and/or the like; functions that can display the data and analysis to the operator in a meaningful manner; and functions that the operator can use to apply fixes to portions of the system and/or to restart individual portions of the system that may be causing problems, among others. In an embodiment, the troubleshooting functions can include accessibility functions such as support for a plurality of different screen sizes (e.g., 24×80, 43×80, and/or the like), support for different types of access devices and access device and/or emulation protocols (e.g., TN3270, TN3270E, and/or the like), a primary panel presented with login information to allow access to its features, a HELP option for all supported functions and commands, and/or the like.

In an embodiment, the troubleshooting functions can include security functions such as access control to computer maintenance application 88 and/or the mainframe system 82 through authentication in any security software active in the environment; the ability to retrieve and to recognize security options such as passwords and/or passphrases, which may include mixed characters; control of access by command to individual systems (z/OS, Automation, Databases, Storage, Security, etc.) protected in the security software and granted access according to a profile associated with the user; and/or the like. In an embodiment, the troubleshooting functions can include updating functions such as the ability to edit datasets, including the system's PARMLIB and PROCLIB, to allow the correction of errors that may have been introduced in its initialization parameters; the ability to allocate page datasets and other VSAM datasets to solve the problems of system resources, including the ability to execute z/OS commands to add new features to the system, such as page datasets, SMF datasets, and/or the like; the ability to cancel JOBs or STCs that may be contributing to the instability of the mainframe system 82; the ability to execute commands in the system, submit JOBs to JES2, monitor the execution of JOBs, access the SYSOUTs produced by JOBs that are in any of the JES2 queues (input, executing, output); and/or the like. In an embodiment, the troubleshooting functions can include access functions such as providing access to disk volumes and their datasets to mitigate eventual problems related to access to datasets and dasds), including providing access to messages recorded in the Operating System's SYSLOG for the analysis of the problem and its solution and the ability to access the SYSLOG in memory if JES2 is unavailable; providing access to system catalogs with the ability to issue necessary commands to solve problems related to them; and/or the like.

System accessing via VTAM interface module 92 of system 72, as executed by computer system/server 12, is configured to access mainframe system 82 with computer maintenance application 88 using the VTAM 272 interface. In an embodiment, VTAM 272 interface can start computer maintenance application 88 (e.g., VTAM feature 3270 internal access) automatically during IPL 310 (FIG. 5). Alternatively, VTAM 272 interface can start computer maintenance application 88 automatically in response to an indication that TSO 250 is not functioning. For example, VTAM 272 interface can periodically poll TSO 250 and can start computer maintenance application 88 if the poll data indicates a non-functioning TSO 250. Alternatively, another subsystem can be periodically poll TSO 250 and can issue a request that VTAM 272 interface start computer maintenance application 88 in response to poll data indicating that TSO 250 is not functioning. In yet another alternative, an operator of mainframe system 82 can start computer maintenance application 88 manually (e.g., in response to TSO 250 not being available).

Figure 6:
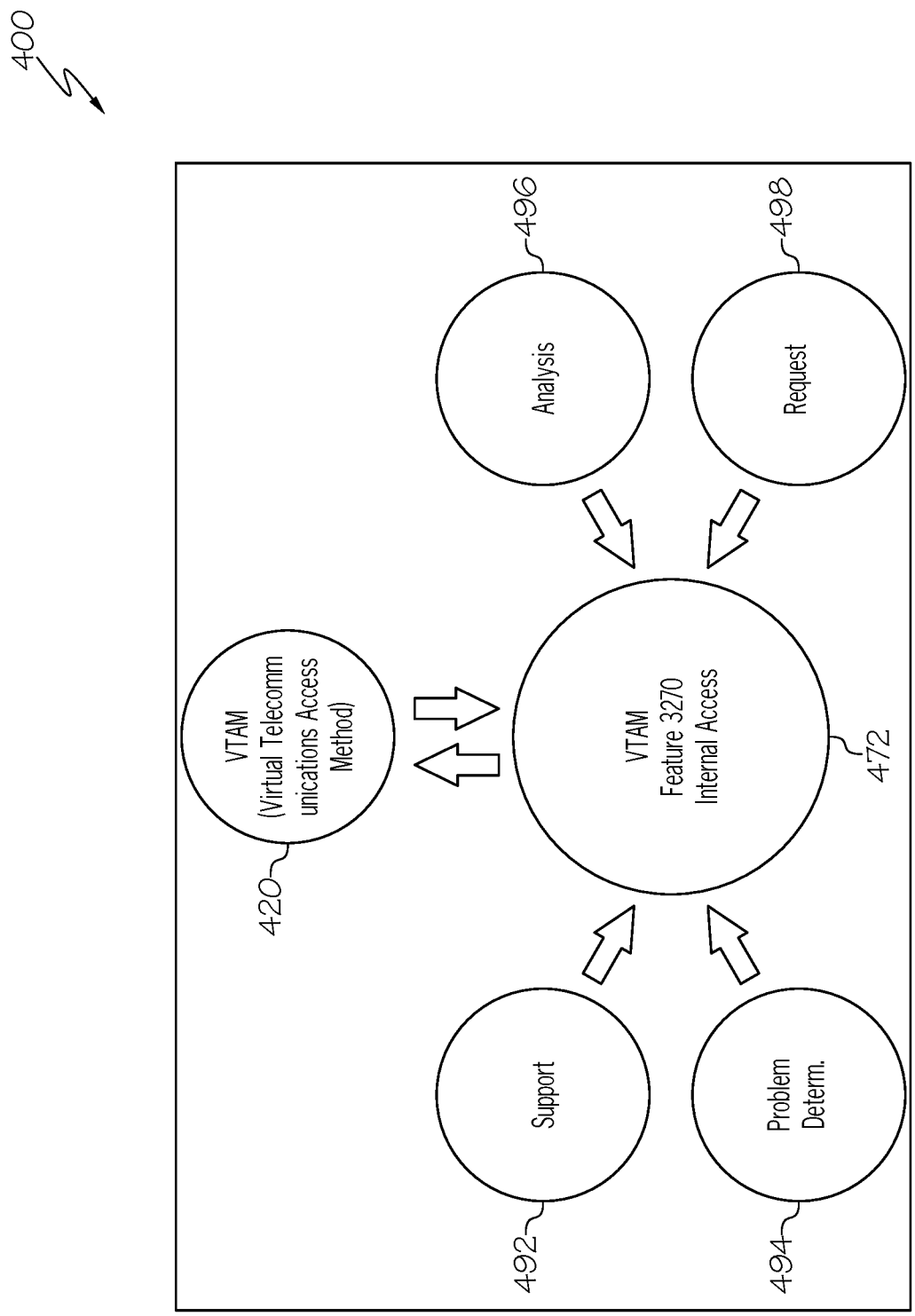
FIG. 6 depicts a components diagram according to an embodiment of the present invention.

Referring now to FIG. 6, a components diagram 400 is shown according to embodiments of the invention. Referring additionally to FIGS. 2 and 4, as shown, components diagram 400 shows the VTAM 420 communications interface as also illustrated as VTAM 220 of FIG. 4. VTAM 420 is connected to computer maintenance application 88 (shown in FIG. 4 as VTAM feature 3270 internal access 472). VTAM feature 3270 internal access 472 can connect to VTAM 420 through the 3270 interface port, although other embodiments are envisioned. In any case, VTAM feature 3270 internal access 472 has a number of different troubleshooting functions included therein. As shown, categories of troubleshooting functions include, but are not limited to, support 492, problem determining 494, analysis 496, and request 498.

Referring again to FIG. 2 in conjunction with FIGS. 3 and 4, maintenance activity performing module 94 of system 72, as executed by computer system/server 12, is configured to perform a maintenance activity on mainframe system 82 using computer maintenance application 88. Because VTAM 220, historically, in the last 30 years or more, has no impact in starting when TSO 250 is unavailable, the access provided by system accessing via VTAM interface module 92 allows computer maintenance application 88 to perform the maintenance activity in z/OS 210 environment through VTAM 220 interface. This maintenance activity can include, but is not limited to, accessing a user catalog, accessing a system dataset; restarting a system service, installing a driver, scheduling a job, defining a resource, and/or the like.

Figure 7:
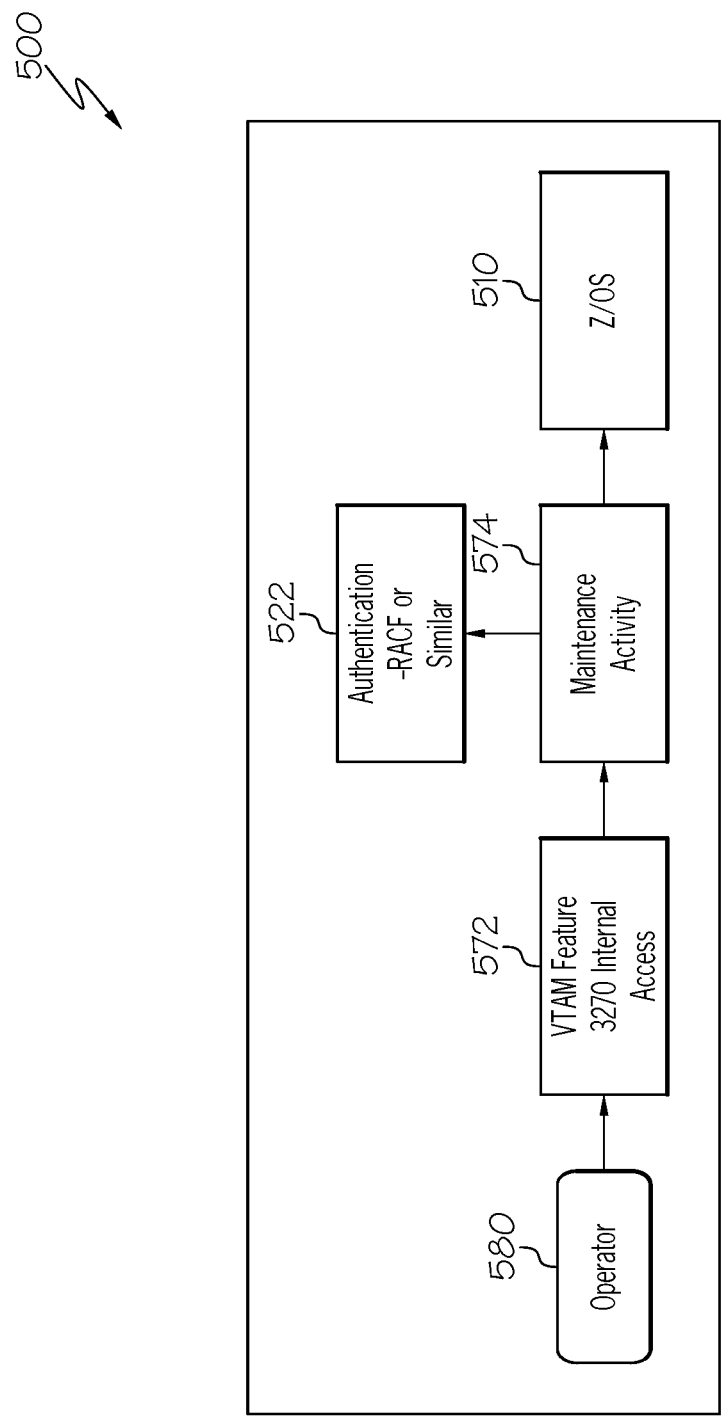
FIG. 7 depicts an example process flow according to an embodiment of the present invention.

Referring now to FIG. 7, an example process flow 500 is depicted according to an embodiment. Referring additionally to FIGS. 2 and 4, as illustrated, operator 580 uses computer maintenance application (e.g., VTAM feature 3270 internal access 572) to perform a maintenance activity 574 on z/OS 510 (e.g., mainframe system 82). Authentication—RACF or similar 522 performs authentication services to determine whether operator 580 is authorized to perform maintenance activity 574 on z/OS 510. In response to a positive authentication, maintenance activity 574 is performed on z/OS 510.

In an embodiment, computer maintenance application 88 can provide operator 580 with a set of menus or other interface options that allow operator 580 to perform the maintenance activity 574. For example, operator 580 can be provided with an option to access datasets on mainframe system 82. This option can allow access to the system's datasets (e.g., through filters), allowing for searching of the catalog or accessing datasets directly in the index/vtoc of one or more disks. Operator 580 can specify the name of a z/OS 210 dataset, according to the limitations of the z/OS 210 system (44 characters), or a filter can be used in the name of the dataset or in the volser to search. In response to the command, computer maintenance application 88 can return one or more screens with the names of the datasets and the disk where they are contained to operator 580.

Once a dataset has been identified, computer maintenance application 88 can be used to perform a number of operations on the dataset. Operator 580 may choose an Information function to return characteristics of the dataset (organization, record size, block size, type of allocation, quantity allocated to primary and secondary area, percentage of space used. Operator 580 may also choose a Catalog function to catalog the dataset or an Uncatalog function to uncatalog the dataset. Operator 580 may also select a Rename function to rename the dataset or a Delete function to delete the dataset. Operator 580 may also choose a Browse function to view the contents of the dataset, an Edit function to edit the dataset and change the contents thereof, or a Copy function copy the dataset to another with a different name. Operator 580 may also select a Free function to free up unused space in the dataset or an Xcompress function to compress datasets with partitioned organization (PO). Operator 580 may also choose an Allocate function, which can be used to allocate sequential and partitioned datasets.

Computer maintenance application 88 can also be used to perform a number of operations on storage volumes. Operator 580 may also select a DASD function to display the disks that are online and to allow operator 580 command line access to see all the datasets of a determined dasd (VTOC). Operator 580 may also choose a TAPE function to display the TAPE units that are online in the system, mounted status and volumes or mount pending.

If JES2 230 is available, computer maintenance application 88 can be used to interact with JES2 230 for a more detailed solution. To accomplish this, computer maintenance application 88 can include a number of options for monitoring JOBs that are in the JES2 230 input queue 232, executing queue 234, output queue 236, and held queue. These options can allow filters, such as PREFIX and OWNER, to be specified to select specific units of work. Operator 580 may select a DA function to allow viewing of all active address spaces in the system. Operator 580 may also choose an ST function to present the status of all JOBs active in the system, according to the filter that was specified and the owner that was specified and to allow to select in a specific job to see the sysouts generated by the JOBs, STCs and TSOs userids at input queue 232, executing queue 234, held queue, and output queue 236. Operator 580 may also select a LOG function to allow the SYSLOG of the system to be displayed, with options to find arguments for quick localization of information and to allow the execution of system commands and visualization of the results.

Computer maintenance application 88 can also be used to perform a number of utilities functions. For example, operator 580 can select an AMS function to open an IDCAMS interface that provides access method services, allowing operator 580 to execute all or a subset of commands allowed by IDCAMS. These commands can be used to define VSAM datasets, delete VSAM and other datasets or PDS members, and provide the ability to define VSAM components, such as Page Datasets, SMF Datasets, Logstreams, etc., when JES2 230 is unavailable.

Referring back to the Monday morning PAGE dataset example detailed above, computer maintenance application 88 can be used to resolve the issue quickly. Through its VTAM 220 access, computer maintenance application 88 can access mainframe system 82. The access method services provided through the IDCAMS interface can be used to define a new PAGE dataset online and then activate it via the existing command interface in computer maintenance application 88. With the PAGE datasets no longer completely filled, mainframe system 82 will shortly return to normal, resulting in TSO 250 being available again to complete the diagnosis required to solve the problem.

Figure 8:
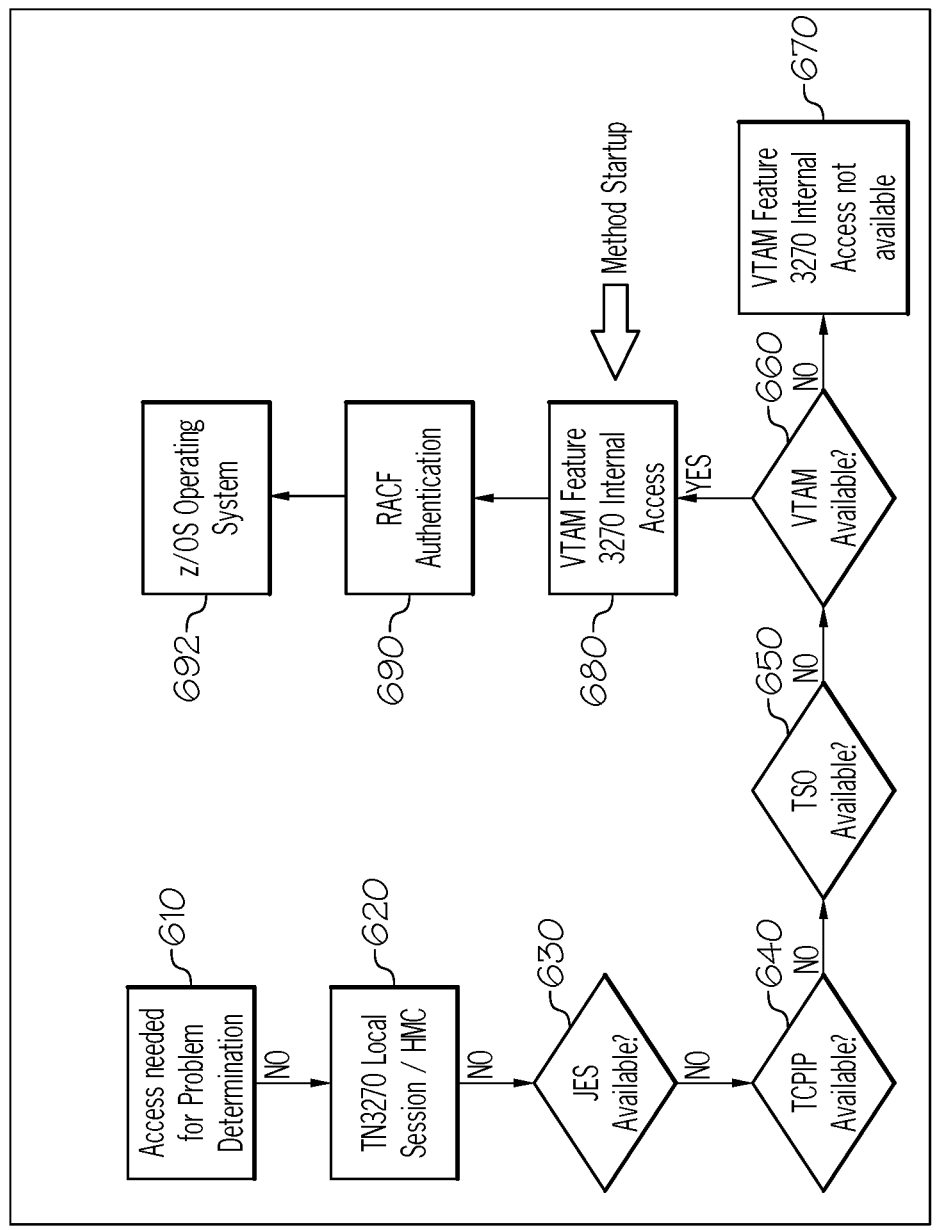
FIG. 8 depicts an example process flow according to an embodiment of the present invention.

Referring now to FIG. 8, an example process flow 600 is depicted according to an embodiment. Referring additionally to FIG. 4, process begins at 610 where access is needed for problem determination. Access to the z/OS 210 interface may be deemed necessary to make a corrective action in response to an IPL or z/OS 210 startup error to resolve any issue that made the IPL not successful at first. At 620 a TN3270 local session/HMC is initiated to access the LPar (e.g., via TN3270 session emulator, host on demand, personal communication and/or the like). At 630 a determination is made as to whether JES 230 is available. If JES 230 is not available the logon method will most often be different since the TSO 250 has JES 230 as one of main parts to be UP and RUNNING, and process will flow to 640, where a determination is made as to whether TCPIP 238 is available. If TCPIP 238 is not available the logon method will most often be different since the TSO 250 has TCPIP 238 as one of main parts to be UP and RUNNING, and process will flow to 650, where a determination is made as to whether TSO 250 is available. Since JES 230 and TCPIP 238 are not available, it is most likely that TSO 250 is not UP and RUNNING, making the conventional interactive session using TSO 250 not possible and necessitating use of an alternative method. At 660 a determination is made as to whether VTAM 220 is available. If VTAM 220 is unavailable, process flows to 670 where VTAM feature 3270 internal access 272 is not available, and process ends. Conversely, if VTAM is available, process flows to 680 where VTAM feature 3270 internal access 272 method startup initiates to use VTAM 220 interface for interacting with z/OS 210. At 690, RACF 222 authentication occurs. During an IPL, the RACF 222 is always available and in use to avoid security issues and risks, allowing normal RACF authentication to be made. Finally, process flows to 692, where z/OS 210 operating system is loaded and available for an interactive session. VTAM feature 3270 internal access 272 uses VTAM 220 to access z/OS 210 for problem determination, urgent requests or any activity that demands any interaction with z/OS 210.

Figure 9:
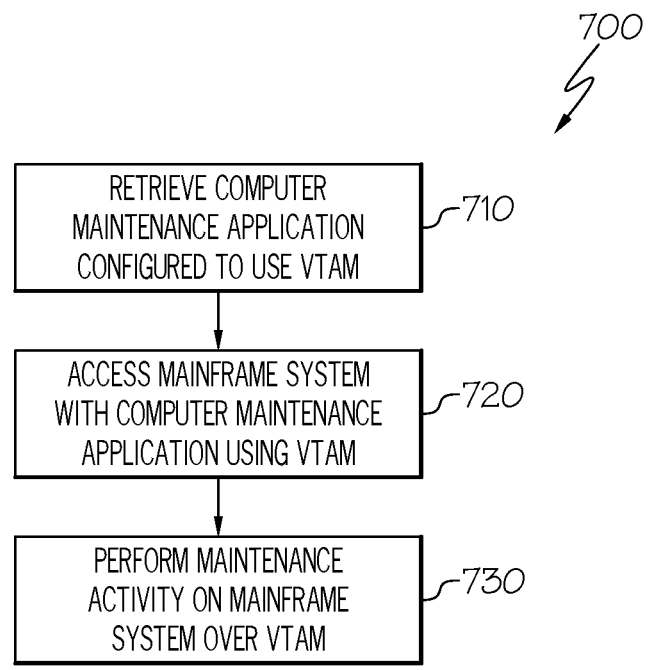
FIG. 9 depicts an example process flow according to an embodiment of the present invention.

Referring now to FIG. 9 in conjunction with FIGS. 1, 2 and 4, a method flow diagram 700 according to an embodiment of the present invention is shown. At 710, VTAM maintenance application retrieval module 90 of system 72, as executed by computer system/server 12, retrieves a computer maintenance application 88 that is configured to use VTAM 220 interface to connect to mainframe system 82. At 720, system accessing via VTAM interface module 92 of system 72, as executed by computer system/server 12, accesses mainframe system 82 with computer maintenance application 88 using VTAM 220 interface. At 730, maintenance activity performing module 94, performs maintenance activity 574 (FIG. 7) on mainframe system 82 using computer maintenance application 88.

The flows of FIGS. 8 and 9 illustrate the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for restoring system functionality when a primary maintenance interface is unavailable, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for responding to a threat. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for restoring system functionality when a primary maintenance interface is unavailable. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may for instance, comprise one or more physical or logical blocks of computer instructions, which may for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, availability detector 118 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided approaches for restoring system functionality when a primary maintenance interface is unavailable. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for restoring system functionality when a primary maintenance interface is unavailable, the method comprising the computer-implemented processes of:
   receiving an indication that the primary maintenance interface, which is a time sharing option (TSO) interface, for troubleshooting a mainframe system is unavailable, wherein the indication is based on monitoring the TSO interface;
   in response to the indication that the TSO interface is unavailable, retrieving a computer maintenance application that is configured to use a Virtual Telecommunications Access Method (VTAM) interface to connect to a mainframe system, wherein the computer maintenance application is retrieved from a datastore;
   accessing the mainframe system with the computer maintenance application using the VTAM interface, wherein the computer maintenance application performs the troubleshooting on the mainframe system via the VTAM interface in response to the TSO interface being unavailable for the troubleshooting; and
   performing a maintenance activity on the mainframe system using the computer maintenance application.

2. The method of claim 1, further comprising:
   adapting a set of troubleshooting functions used to troubleshoot the mainframe system to function over the VTAM interface; and
   including the set of troubleshooting functions in the computer maintenance application.

3. The method of claim 2, wherein at least one troubleshooting function of the set of troubleshooting functions is a modified function based on a time sharing option (TSO) troubleshooting function.

4. The method of claim 1, wherein the maintenance activity is selected from at least one of: accessing a user catalog, accessing a system dataset, restarting a system service, installing a driver, or scheduling a job.

5. The method of claim 1, wherein the indication that the TSO interface is unavailable for the troubleshooting of the mainframe system is based on an unavailability of a Transmission Control Protocol/Internet Protocol (TCP/IP).

6. The method of claim 1,
   wherein the mainframe system is a mainframe in a networked computing environment, and
   wherein the TSO interface is unavailable because a service that supports the TSO is unavailable, the service being a Job Entry Subsystem 2 (JES2).

7. The method of claim 6, wherein the networked computing environment is a cloud computing environment and wherein the mainframe executes a z/OS operating system.

8. A system for restoring system functionality when a primary maintenance interface is unavailable, comprising:
   a memory medium comprising instructions;
   a bus coupled to the memory medium; and
   a processor coupled to the bus that when executing the instructions causes the system to:
      receive an indication that the primary maintenance interface, which is a time sharing option (TSO) interface, for troubleshooting a mainframe system is unavailable, wherein the indication is based on monitoring the TSO interface;
      in response to the indication that the TSO interface is unavailable, retrieve a computer maintenance application that is configured to use a Virtual Telecommunications Access Method (VTAM) interface to connect to a mainframe system, wherein the computer maintenance application is retrieved from a datastore;

access the mainframe system with the computer maintenance application using the VTAM interface, wherein the computer maintenance application performs the troubleshooting on the mainframe system via the VTAM interface in response to the TSO interface being unavailable for the troubleshooting; and perform a maintenance activity on the mainframe system using the computer maintenance application.

9. The system of claim 8, the instructions further causing the system to:

adapt a set of troubleshooting functions used to troubleshoot the mainframe system to function over the VTAM interface; and include the set of troubleshooting functions in the computer maintenance application.

10. The system of claim 9, wherein at least one troubleshooting function of the set of troubleshooting functions is a modified function based on a time sharing option (TSO) troubleshooting function.

11. The system of claim 8, wherein the maintenance activity is selected from a at least one of: accessing a user catalog, accessing a system dataset; restarting a system service, installing a driver, or scheduling a job.

12. The system of claim 8, wherein the indication that the TSO interface is unavailable for the troubleshooting of the mainframe system is based on an unavailability of a Transmission Control Protocol/Internet Protocol (TCP/IP).

13. The system of claim 1,
wherein the mainframe system is a mainframe in a networked computing environment, and
wherein the TSO interface is unavailable because a service that supports the TSO is unavailable, the service being selected a Job Entry Subsystem 2 (JES2).

14. The system of claim 13, wherein the networked computing environment is a cloud computing environment and wherein the mainframe executes a Z/OS operating system.

15. A computer program product for restoring system functionality when a primary maintenance interface is unavailable, the computer program product comprising a non-transitory computer readable storage medium having program instructions embodied therewith, the program instructions executable by a processor to cause an electronic computation device to:

receive an indication that the primary maintenance interface, which is a time sharing option (TSO) interface, for troubleshooting a mainframe system is unavailable, wherein the indication is based on monitoring the TSO interface;

in response to the indication that the TSO interface is unavailable, retrieve a computer maintenance application that is configured to use a Virtual Telecommunications Access Method (VTAM) interface to connect to a mainframe system, wherein the computer maintenance application is retrieved from a datastore;

access the mainframe system with the computer maintenance application using the VTAM interface, wherein the computer maintenance application performs the troubleshooting on the mainframe system via the VTAM interface in response to the TSO interface being unavailable for the troubleshooting; and perform a maintenance activity on the mainframe system using the computer maintenance application.

16. The computer program product of claim 15, the computer program product further includes program instructions, that when executed by the processor, cause the electronic computation device to:

adapting a set of troubleshooting functions used to troubleshoot the mainframe system to function over the VTAM interface; and including the set of troubleshooting functions in the computer maintenance application.

17. The computer program product of claim 16, wherein at least one troubleshooting function of the set of troubleshooting functions is a modified function based on a time sharing option (TSO) troubleshooting function.

18. The computer program product of claim 15, wherein the maintenance activity is selected from at least one of: accessing a user catalog, accessing a system dataset; restarting a system service, installing a driver, or scheduling a job.

19. The computer program product of claim 15, wherein the indication that the TSO interface is unavailable for the troubleshooting of the mainframe system is based on an unavailability of a Transmission Control Protocol/Internet Protocol (TCP/IP).

20. The computer program product of claim 15,
wherein the mainframe system is a mainframe in a networked computing environment, and
wherein the TSO interface is unavailable because a service that supports the TSO is unavailable, the service being selected a Job Entry Subsystem 2 (JES2).

\* \* \* \* \*